United States Patent Office 3,441,369
Patented Apr. 29, 1969

3,441,369
METHOD FOR CONSERVING WATER
Frederic C. McCoy, Beacon, Edwin C. Knowles, Poughkeepsie, and Howard V. Hess, Glenham, N.Y., assignors to Texaco Inc., New York, N.Y., a corporation of Delaware
No Drawing. Continuation-in-part of application Ser. No. 127,810, July 31, 1961. This application June 1, 1965, Ser. No. 460,559
Int. Cl. B01j 1/18
U.S. Cl. 21—60.5                                7 Claims

ABSTRACT OF THE DISCLOSURE

Method of inhibiting the evaporation of water from a water containing surface by contacting the surface in powdered form with a urea complex formed from urea and a $C_{13}$–$C_{20}$ hydrocarbyl-amine or -acid or the corresponding hydroxy-substituted hydrocarbyl-amine or -acid and forming a substantially monomolecular layer of the hydrocarbyl compound thereon.

---

This application is a continuation-in-part of our copending application Ser. No. 127,810, filed July 31, 1961, now abandoned.

This invention relates to a method for inhibiting the evaporation of water, and in its more specific aspect to a method for conserving water in reservoirs and/or soil by applying a water vapor barrier film thereto. In one aspect, this invention relates to a method of preparing a material which upon application to the reservoir or soil water forms a water vapor barrier film thereon that inhibits the evaporation of water therefrom.

In many geographical areas, particularly arid or semi-arid regions where adequate sources of water are limited or lacking altogether, conservation of water is of major importance. The present invention in an object is directed to a method for conserving water in reservoirs by preparing a hydrocarbon compound of prescribed type-urea complex of a film-forming material exhibiting vapor-inhibiting properties, and contacting the water with the formed complex whereby the complex dissociates and the water vapor inhibiting film is formed on the water surface.

In another aspect the invention is directed to a method of conserving water in soil and concomitantly providing nitrogen values thereto to stimulate the growth of plants and crops therein. This object is also attained by contacting the soil with the complex. The complex dissociates on coming in contact with the soil water and forms a barrier film in the soil which inhibits the evaporation of water contained therein. In addition, dissociation of the complex provides nitrogen values in the form of urea to the soil.

In accordance with our invention, there is applied to the reservoir and/or the soil water a film-forming agent or material which has been complexed with urea and subsequently dissociates upon contact with the reservoir water or the water in the soil to form a water vapor-inhibiting film. The water vapor barrier film-forming agent comprises a substantially hydrophobic aliphatic hydrocarbon compound, having the general formula R–A, wherein A is a member selected from the group consisting of —$NH_2$ and —COOH, and R is a hydrocarbyl or a hydroxy substituted hydrocarbyl radical containing 13 to 20 carbon atoms therein, said compound being capable of forming a complex with urea and possessing a polar group exhibiting an affinity for water, as described more fully hereinafter.

The complex is formed by dissolving or dispersing the aliphatic hydrocarbon compound in a suitable liquid solvent, preferably a non-aqueous solvent. The resulting solution or dispersion of the hydrocarbon compound is brought into contact with urea dissolved in a polar solvent and there is formed a solid urea-aliphatic hydrocarbon compound complex which is readily separated from the solvent. It is preferable to employ a saturated solution of the complexing agent, e.g. urea, in a polar solvent. The resulting solid complex is recovered from the remaining solution as by filtering, centrifuging, or the like, and the complex may be washed, dried and recovered in finely divided or powder form. The complex can then be brought into contact with the water in the reservoir or the soil preferably by applying the solid or powdered complex to the water or soil surface or mixing it therewith so that it contacts the water therein to dissociate the complex. The aliphatic hydrocarbon compound on contact with the water in the reservoir or soil is released from the complex and forms a barrier film which is usually in the form of a monomolecular layer. Water acting on the polar group, or hydrophilic portion, of the aliphatic hydrocarbon compound results in the desired spreading of the material, and the hydrophobic portion causes the monomolecular layer to form on the surface of the water.

In the event that the soil is relatively water-free little if any dissociation of the complex takes place. However, when the soil becomes moist with water, such as by precipitation or irrigation, the complex dissociates and supplies the barrier film and nitrogen to the soil.

The aliphatic hydrocarbon compounds found suitable for our invention must have a straight chain portion at least between 13 and 20 carbon atoms, and, in addition, must be capable of forming a complex with the complexing agent, e.g. urea. In addition the aliphatic hydrocarbon compound although substantially hydrophobic must contain a polar —$NH_2$ or a —COOH group, preferably a terminal polar group, exhibiting an affinity for water. The straight chain portion of the aliphatic hydrocarbon compound may be saturated or olefinically unsaturated. Representative aliphatic hydrocarbon compounds of prescribed type include fatty acids, such as myristic acid, palmitic acid, stearic acid, arachidic acid, hydroxystearic acid, oleic acid and linoleic acid, the aliphatic fatty amines, hexadecylamine and octadecylamine and mixtures of the fatty acids and amines. The present invention is particularly advantageous in that it permits the use of commercially available mixtures of aliphatic fatty acids which are particularly attractive for use in water conservation because of their relatively low cost.

When the hydrocarbon compound is a solid at room temperature and atmospheric pressure, the compound is dissolved initially in a liquid solvent which desirably includes the various normally liquid petroleum hydrocarbons or petroleum fractions in the naphtha boiling range, such as petroleum hydrocarbons having a boiling point or range of from about 125 to 425° F. Aromatic hydrocarbons, for example, benzene, toluene and xylenes, are preferred. The liquid solvent should be substantially devoid of those compounds or hydrocarbons which form a complex with urea under the conditions of complex formation or complex dissociation.

It is well recognized that a number of aliphatic hydrocarbon compounds, upon treatment with urea, or its analogs e.g. thiourea, form a complex, often a solid, crystalline complex. In practicing our invention, the complexing agent consisting of urea is initially dissolved in a polar solvent, e.g. an alcohol, which is then mixed with a solution of the aliphatic hydrocarbon compound of prescribed type from the complex. The formed complex can be separated from the solution and may be recovered by any suitable means, such as filtering, decanting, centrifuging, or the like. The complexing action desirably occurs at a temperature in the range of from about 40° F. to 125° F., although higher temperatures may be employed depending to some extent upon the melting point of each component making up the mixture.

The complex containing the film-forming agent is contacted with, or added directly to, the surface of the water and/or soil or admixed therein in the form of a fine powder or aerosol. The complex, upon contact with the water, dissociates thereby releasing the aliphatic hydrocarbon compound which spreads as a thin film over the water. The urea portion of the complex applied to the soil serves as a source of nitrogen to the soil.

Suitable polar solvents in which the urea complexing agent is dissolved include the normally liquid polar aliphatic organic compounds. These include, for example, the alkanols, such as methanol, ethanol, propanol, isopropanol, isobutanol, n-butanol, tertiary butyl alcohol; the various ketones, such as acetone, methylethyl ketone, finely powdered complex product was obtained. In one example, 5% by weight Cab-O-Sil, an anti-caking agent, was thoroughly admixed with the dried solid complex.

Several series of tests were conducted to evaluate the vapor-inhibiting properties of the aliphatic hydrocarbon compound of prescribed type. The powdered complex in an amount of 50 milligrams was dusted onto the surface of 400 milliliters of deionized water contained in an 800 milliliter beaker. The beakers were weighed to the nearest gram, and allowed to stand uncovered at ambient temperature. Thereafter, the beakers were weighed at approximately 24 hour intervals. The loss in weight was taken as the amount of water evaporation. For each series of tests, there was provided as a Control a beaker of water having no film-forming agent added thereto.

The following table shows the results of the tests. The data indicate the cumulative amount in grams of water evaporation from each beaker.

TABLE.—EVAPORATION TESTS

| | | Wt. (grams) of water evaporated | | | Percent reduction | | |
|---|---|---|---|---|---|---|---|
| Example | Material | After 1 day | 2 days | 5 days | Over 1 day | Control 2 days | 5 days |
| Series I: | | | | | | | |
| 1 | Control A | 21 | 37 | 72 | | | |
| 2 | Octadecylamine-urea-complex. | 14 | 26 | 55 | 33.3 | 29.7 | 23.6 |
| 3 | Stearic acid-urea complex. | 15 | 28 | 59 | 28.5 | 24.3 | 18.0 |
| Series II: | | | | | | | |
| 4 | Control B | 20 | 35 | ¹60 | | | (¹) |
| 5 | Myristic acid-urea complex. | 15 | 28 | ¹53 | 25 | 20 | ¹11.7 |
| 6 | Palmityl amine-urea complex. | 15 | 28 | ¹49 | 25 | 20 | ¹18.3 |
| 7 | Ex. 5 complex plus 5% Microcil.² | 17 | 30 | ¹55 | 15 | 14.3 | ¹8.4 |
| 8 | Ex. 6 complex plus 5% Microcil.² | 19 | 31 | ¹54 | 5 | 11.4 | ¹10 |

¹ Measured after 4 days.  ² Anti-caking agent ethylpropyl ketone, methyl propyl ketone, methyl n-butyl ketone, methylisobutyl ketone; aqueous solutions of the foregoing; and water. In general, any normally liquid polar aliphatic organic compound containing from 1 to 6 carbon atoms per molecule can suitably be employed. Other polar solvents which may suitably be employed include the low boiling amines such as ethylamine; the low boiling mercaptans such as ethyl mercaptan; the olefinic glycols, such as monoethylene glycol; the alkanolamines, such as ethanolamine; or mixtures thereof, such as an aqueous solution of methanol and monoethylene glycol.

Where deemed desirable, a small amount of a microdimensional silica powder or alumina powder which are hydrophilic may be incorporated in the powdered complex product. The amount of silica or alumina powder used depends somewhat upon the hydrocarbon derivative being treated, but generally about 0.5 to 10% by weight is satisfactory. The microdimensional powder serves as an anti-caking agent to assist in maintaining the complex in a substantially dry state and makes it free-flowing. Suitable microdimensional powders include a finely powdered silica sold under the Trade name "Cab-O-Sil" and a finely powdered alumina sold under the Trade name "Alon C."

In the following examples which further illustrate our invention, a complex of the aliphatic hydrocarbon compound was prepared according to the following procedure:

For each example, 56 grams of the aliphatic hydrocarbon compound to be complexed with urea was dissolved in 750 milliliters of benzene. A saturated solution of urea in methanol was prepared, and 500 milliliters of this solution was added to the benzene solution containing the hydrocarbon derivative at about 80° F. with vigorous stirring. The mixture was stirred for about 15 minutes, and the resulting solid complex was separated from the remaining solution by filtration with a Buchner funnel. The solid complex was washed several times with 50 milliliter portions of pentane and permitted to air dry. A It will be observed from the table that the materials tested provided an effective vapor barrier film whereby evaporation of water was inhibited. Thus, the method provided in accordance with our invention offers an effective means in forming a vapor-inhibiting film on the exposed surface of the water.

Obviously, many modifications and variations of the invention as hereinbefore set forth may be made without departing from the spirit and scope thereof, and therefore only such limitations may be made as are indicated in the appended claims.

We claim:
1. Method of inhibiting the evaporation of water from a surface thereof which comprises contacting said surface with a urea complex comprising urea and a hydrocarbon compound having the general formula R—A, wherein A is a member selected from the group consisting of —NH₂ and —COOH, and R is a member selected from the group consisting of a hydrocarbyl radical and a hydroxy-substituted hydrocarbyl radical containing from 13 to 20 carbon atoms therein, said complex being applied in powdered form to said water surface and forming a substantially monomolecular layer of said hydrocarbon compound thereon.

2. The method of claim 1 wherein said hydrocarbon compound is stearic acid.

3. The method of claim 1 wherein said hydrocarbon compound is octadecylamine.

4. The method of claim 1 wherein said hydrocarbon compound is a mixture of a fatty acid and a fatty amine.

5. The method of claim 1 wherein said hydrocarbon compound is a mixture of fatty acids.

6. The method of claim 1 wherein said complex has admixed therewith from about 0.5 to about 10% by weight of a finely-divided anti-caking agent selected from the group consisting of alumina powder and silica powder.

7. The method of claim 1 wherein said surface is soil.

(References on following page)

References Cited

UNITED STATES PATENTS 3,146,059  8/1964  Suzuki et al. _____ 21—60.5

OTHER REFERENCES

Fieser et al.: "Advanced Organic Chemistry," 131–133, Reinhold Publishing Corp., New York, 1961.

"Reservoir Evaporation Reduction Through the Use of Monomolecular Layers," a paper presented to American Water Works Association by Timblin et al., pp. 1, 10–11, September 1957.

E. P. Whitlow et al.: "Proceedings of Eighteenth Annual Water Conference," Engineers Society of Western Pennsylvania, pp. 41–46, October 1957.

MORRIS O. WOLK, *Primary Examiner.*

SIDNEY MARANTZ, *Assistant Examiner.*

U.S. Cl. X.R.

260—96.5